United States Patent
Sadana et al.

(10) Patent No.: US 12,068,477 B2
(45) Date of Patent: Aug. 20, 2024

(54) SOLID STATE LITHIUM ION RECHARGEABLE BATTERY

(71) Applicant: INTERNATIONAL BUSINESS MACHINES CORPORATION, Armonk, NY (US)

(72) Inventors: Devendra K. Sadana, Pleasantville, NY (US); Stephen W. Bedell, Wappingers Falls, NY (US); Joel P. de Souza, Putam Valley, NY (US); John Collins, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 16/679,369

(22) Filed: Nov. 11, 2019

(65) Prior Publication Data
US 2021/0143417 A1    May 13, 2021

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0402* (2013.01); *H01M 4/1395* (2013.01); *H01M 4/366* (2013.01); *H01M 4/80* (2013.01)

(58) Field of Classification Search
CPC ........ H01M 4/80; H01M 4/661; H01M 4/669; H01M 4/386; H01M 2004/027;
(Continued)

(56) References Cited

U.S. PATENT DOCUMENTS

| 8,133,613 B2 | 3/2012 | Ramasubramanian et al. |
| 9,123,954 B2 | 9/2015 | Nathan |

(Continued)

FOREIGN PATENT DOCUMENTS

| KR | 20200107852 | * | 9/2020 | .......... H01M 10/052 |
| KR | 10-20210013963 | * | 4/2021 | .......... H01M 10/052 |

OTHER PUBLICATIONS

G. T. Sevilla et. al. "Silicon fabric for multi-functional applications," 2013 Transducers & Eurosensors XXVII: The 17th International Conference on Solid-State Sensors, Actuators and Microsystems (Transducers & Eurosensors XXVII), 2013, pp. 2 (Year: 2013).*

(Continued)

*Primary Examiner* — Matthew T Martin
*Assistant Examiner* — Ankith R Sripathi
(74) *Attorney, Agent, or Firm* — Randy Tejeda

(57) ABSTRACT

A method of forming a solid-state lithium ion rechargeable battery may include depositing a metal layer onto a top surface of a substrate, depositing a handle layer onto a top surface of the metal layer, wherein a portion of the handle layer overlaps the metal layer and the substrate, spalling a portion of the substrate thereby forming a spalled substrate layer, porosifying the spalled substrate layer thereby forming a porous substrate layer, depositing an electrolyte layer onto a top surface of the porous substrate layer, wherein the electrolyte layer is in direct contact with the porous substrate layer, and depositing a cathode onto a top surface of the electrolyte layer. The method may include depositing a cathode contact layer onto a top surface of the cathode, wherein the cathode contact layer is in direct contact with the cathode. The porous substrate layer may be made of silicon.

7 Claims, 5 Drawing Sheets

(51) Int. Cl.
*H01M 4/1395* (2010.01)
*H01M 4/36* (2006.01)
*H01M 4/80* (2006.01)

(58) Field of Classification Search
CPC .. H01M 4/0402; H01M 4/1395; H01M 4/366; Y02E 60/10
See application file for complete search history.

(56) References Cited

U.S. PATENT DOCUMENTS

| | | | |
|---|---|---|---|
| 9,252,426 | B2 | 2/2016 | Green |
| 9,496,165 | B1 | 11/2016 | Bedell et al. |
| 10,586,976 | B2 * | 3/2020 | Cho ........................ H01M 4/38 |
| 2004/0126659 | A1 | 7/2004 | Graetz et al. |
| 2007/0117018 | A1 | 5/2007 | Huggins |
| 2011/0111294 | A1 * | 5/2011 | Lopez .................. H01M 4/505 977/773 |
| 2011/0294012 | A1 * | 12/2011 | Nakabayashi ........ H01M 4/134 252/514 |
| 2012/0231326 | A1 | 9/2012 | Biswal et al. |
| 2013/0157096 | A1 * | 6/2013 | Nakagiri ........... H01M 10/0587 429/94 |
| 2013/0273420 | A1 * | 10/2013 | Nakayama .............. H01M 4/26 429/211 |
| 2014/0011088 | A1 * | 1/2014 | Lopatin ................. H01M 4/386 429/211 |
| 2016/0087577 | A1 | 3/2016 | Albadri et al. |
| 2016/0226065 | A1 * | 8/2016 | Karabacak .......... H01J 37/3417 |
| 2019/0341584 | A1 * | 11/2019 | Schreiber .............. H01M 4/485 |
| 2020/0075960 | A1 * | 3/2020 | Wachsman .......... H01M 4/8621 |
| 2020/0212491 | A1 * | 7/2020 | Collins ................. H01M 4/131 |
| 2021/0344017 | A1 * | 11/2021 | Hong ........................ B22F 3/26 |
| 2021/0359288 | A1 * | 11/2021 | Koo .................... H01M 10/052 |

OTHER PUBLICATIONS

Chihyun Hwang, Conductive and Porous Silicon Nanowire Anodes for Lithium Ion Batteries , et al 2017 J. Electrochem. Soc. 164 A1564 (Year: 2017).*
Machine Translation of Kim (Year: 2020).*
Zhang et. al., Controlled spalling and flexible integration of PZT film based on LaNiO3 buffer layer, Ceramic International, vol. 45, Issue 5, 2019, pp. 6373-6379 ISSN 0272-8842, (https://www.sciencedirect.com/science/article/pii/S0272884218335053) (Year: 2019).*
Oumellal et al., "The failure mechanism of nano-sized Si-based negative electrodes for lithium ion batteries," Journal of Materials Chemistry, vol. 21, 2011, pp. 6201-6208.
Zuo et al., "Silicon based lithium-ion battery anodes: A chronicle perspective review," Nano Energy, vol. 31, 2017, pp. 113-143.

* cited by examiner

SOLID STATE LITHIUM ION RECHARGEABLE BATTERY

BACKGROUND

The present invention relates generally to a solid-state battery, and more particularly, to a structure and method of forming a solid-state lithium ion rechargeable battery.

A typical solid-state lithium ion rechargeable battery includes different layers of materials, including, but not limited to, a cathode, a separator and an anode. Capacity of such a battery is generally limited by the cathode layer thickness and structure. As such, a thick cathode layer may translate to a battery with high capacity whereas a thin cathode layer may translate to a battery with low capacity. Further, the anode is typically made of lithium or a lithium alloy.

SUMMARY

According to one embodiment of the present invention, a method of forming a solid-state lithium ion rechargeable battery is provided. The method may include depositing a metal layer onto a top surface of a substrate, depositing a handle layer onto a top surface of the metal layer, wherein a portion of the handle layer overlaps the metal layer and the substrate, spalling a portion of the substrate thereby forming a spalled substrate layer, porosifying the spalled substrate layer thereby forming a porous substrate layer, depositing an electrolyte layer onto a top surface of the porous substrate layer, wherein the electrolyte layer is in direct contact with the porous substrate layer, and depositing a cathode onto a top surface of the electrolyte layer. The method may include depositing a cathode contact layer onto a top surface of the cathode, wherein the cathode contact layer is in direct contact with the cathode. The porous substrate layer may be made of silicon. The porous substrate layer may be an anode. The metal layer may be made of non-reactive metal having high tensile strength. The method may include initiating a spalling mode fracture in the substrate at a depth below a substrate/metal layer interface and pulling of the handle layer causing the portion of the substrate to be spalled.

According to another embodiment of the present invention, a method of forming a solid-state lithium ion rechargeable battery is provided. The method may include depositing a metal layer onto a top surface of a substrate, depositing a handle layer onto a top surface of the metal layer, wherein a portion of the handle layer overlaps the metal layer and the substrate, spalling a portion of the substrate thereby forming a spalled substrate layer, porosifying the spalled substrate layer thereby forming a porous substrate layer, depositing an electrolyte layer onto a top surface of the porous substrate layer, wherein the electrolyte layer is in direct contact with the porous substrate layer, and depositing a cathode onto a top surface of the electrolyte layer. The method may include depositing a cathode contact layer onto a top surface of the cathode, wherein the cathode contact layer is in direct contact with the cathode.

According to another embodiment of the present invention, a structure is provided. The structure may include a porous substrate layer positioned along a metal layer, wherein the porous substrate layer is made of silicon and a cathode positioned on top of an electrolyte layer, wherein the electrolyte layer separates the cathode from the porous substrate layer. The structure may also include a handle layer positioned below the metal layer, wherein the metal layer separates the handle layer from the porous substrate layer and a cathode contact layer positioned on top of the cathode. The metal layer may be made of non-reactive metal having high tensile strength.

BRIEF DESCRIPTION OF THE DRAWINGS

The following detailed description, given by way of example and not intend to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
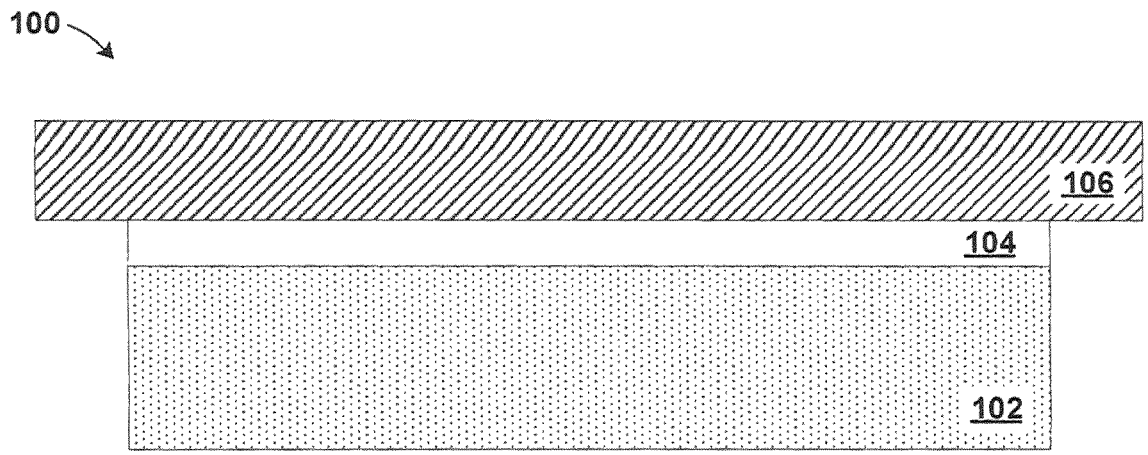
FIG. 1 is a cross section view illustrating a deposited nickel layer and a deposited polyimide tape on a substrate according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiment set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention generally relate to a solid-state battery, and more particularly, to a structure and method of forming a solid-state lithium ion rechargeable battery with silicon as the anode.

Typically, a solid-state rechargeable battery is made of different materials, where each material is layered on top of one another. Such layers may include, but are not limited to, a cathode collector layer, a cathode layer, an electrolyte layer, an anode layer, an anode collector layer, and an insulating layer. Further, the anode layer is typically made of lithium or a lithium alloy.

The optimization of lithium ion-based batteries is currently being driven by the widespread adoption of hybrid, or fully electric vehicles and similar high-capacity portable applications. Further, other materials, such as, for example, silicon are being contemplated as an alternative to lithium. The use of silicon as an anode material for a lithium battery is presently the subject of intense study. Silicon has a high specific capacity of 4,200 $mAhg^{-1}$ and volume capacity of 9,786 $mAh\ cm^{-3}$, which is the highest known for a lithium-based anode.

The major challenge with implementation of a silicon-based anode is the tremendous volume expansion (>300%) upon lithiation of the silicon during charging. This large volumetric change may also mechanically degrade the silicon over many charging and discharging cycles. Presently, a number of approaches using silicon nanostructures, such as, for example, silicon nanowires or particles, that are integrated into a slurry are being investigated with mixed success. Accordingly, there exists a need to inexpensively fabricate a silicon anode battery that accommodates the large strains present during the charging and discharging cycles of the battery. Embodiments of the present invention provide a structure and a method of producing a solid-state battery with a silicon anode layer, allowing for greater accommodation of strain during lithiation when compared to a conventional lithium anode battery.

Referring now to FIG. 1, a structure 100 is shown, in accordance with an embodiment. The structure 100 may include a substrate 102, a metal layer 104, and a handle layer 106. The substrate 102 may include a silicon-based material. Illustrative examples of silicon-based materials suitable for the substrate 102 may include, but are not limited to, silicon, silicon, silicon-germanium, silicon-germanium-carbon, silicon-carbon, and multi-layers thereof. In an embodiment, the substrate 102 may be a p-type silicon that is doped turning the silicon into a conductive material that readily accepts electrons when voltage is applied.

The metal layer 104 may be made of non-reactive metal that has high tensile strength. Illustrative examples of non-reactive metals with high tensile strength may include, but are not limited to, nickel, copper, chromium, iron, and tungsten. Alloys of these metals may also be employed. These metals and their alloys are good examples of non-reactive metals because they do not react with lithium ions.

The metal layer 104 may be deposited directly onto the top surface of the substrate 102 utilizing any well-known deposition process. Generally, deposition may be accomplished by any of dip coating, spin-coating, brush coating, sputtering, chemical vapor deposition, chemical solution deposition, physical vapor deposition, and plating. The metal layer 104 may be deposited substantially onto the whole top surface of the substrate 102.

The metal layer 104 may have a particular stress value. The stress value is dependent on the material used to form the metal layer 104. The metal layer 104 is deposited on top of the substrate 102 to at least a critical thickness. The combination of critical thickness and the stress value of the metal layer 104 allows for a spalling mode fracture (illustrated in FIG. 2) to occur within the substrate 102. The spalling mode fracture is a crack that is formed within the substrate 102. A combination of loading forces maintains a crack trajectory at a depth below the metal layer/substrate interface. If the thickness of metal layer 104 is too great, spalling of the substrate 102 will occur spontaneously. Spontaneous fracture generally leads to other unwanted modes of fracture including film cracking. Substrate spalling using a metal layer 104 with a thickness value above a critical thickness but below a thickness that leads to spontaneous spalling is referred to a Controlled Spalling. For example, a thickness of the metal layer 104 may range from about 4 μm to about 10 μm.

The thickness of the metal layer 104 is chosen to provide a desired fracture depth within the substrate 102. For example, if the metal layer 104 is nickel, then fracture of the substrate 102 may occur at a depth below the metal layer 104, roughly two to three times the thickness of the metal layer 104. As a result, the metal layer 104 is deposited on top of the substrate 102 to a thickness that is at least the same as the critical thickness.

Once the metal layer 104 is deposited, the handle layer 106 is deposited on top of the metal layer 104. The handle layer 106 may also be referred to as a tape layer. The handle layer 106 may include any flexible material such as, for example, a metal tape or a polyimide tape. The handle layer 106 may be used to provide better fracture control and more versatility in handling the spalled portion, i.e., the portion of the substrate 102 below the metal layer 104 and above the fracture surfaces of the substrate 102.

The handle layer 106 may be deposited utilizing deposition techniques that are well known to those skilled in the art including, for example, dip coating, spin-coating, brush coating, sputtering, chemical vapor deposition, plasma enhanced chemical vapor deposition, chemical solution deposition, physical vapor deposition, and plating. In some embodiments, the handle layer 106 may be applied atop the metal layer 104 by hand or by mechanical means. The handle layer 106 is deposited onto the metal layer 104 such that a portion of the handle layer 106 hangs over the edge of the metal layer 104 and the substrate 102.

Figure 2:
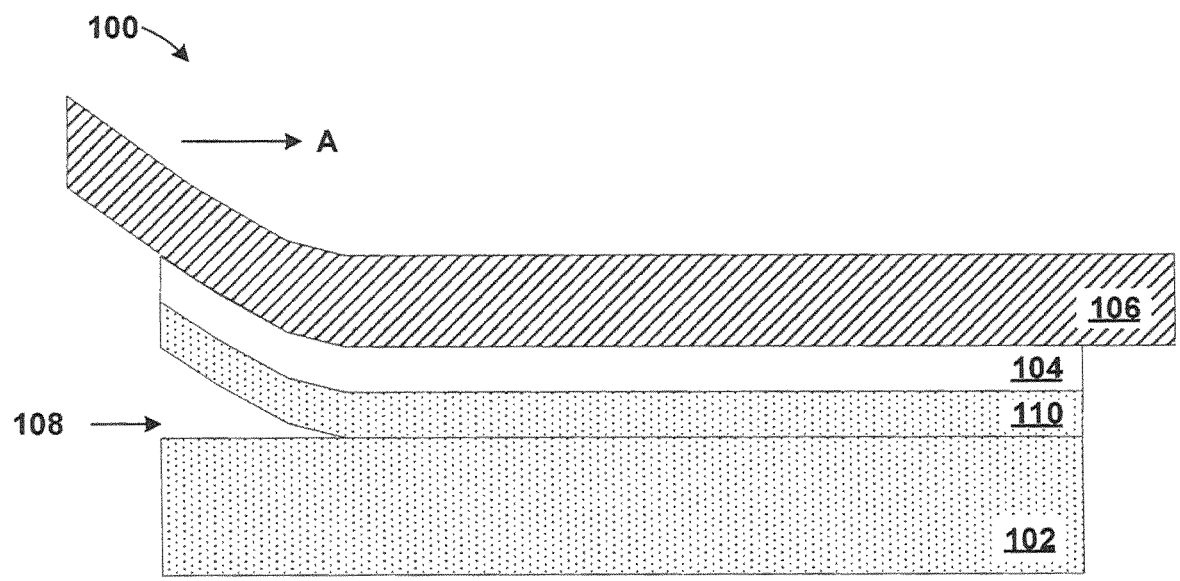
FIG. 2 is a cross section view illustrating spalling a substrate layer according to an exemplary embodiment.

Referring now to FIG. 2, the structure 100 with a spalling mode fracture 108 is shown, in accordance with an embodiment. The spalling mode fracture 108 occurs in the substrate 102 at a depth below the substrate/metal layer interface. The fracture 108 may be initiated by applying a small force on the handle layer 106 near the edge of the substrate 102.

Once the fracture 108 is initiated, the handle layer 106 is gently pulled upwards and in direction A. The pulling of the handle layer 106 pulls the metal layer 104 causing a portion of the substrate 102 to be spalled. The spalling removes a top portion of the substrate 102 from the remaining portion of the substrate 102. Element 110 may be referred to hereinafter as a spalled substrate layer. As shown, the top portion of the spalled substrate layer 110 is attached to the metal layer 104, and the metal layer 104 is attached to the handle layer 106.

Figure 3:
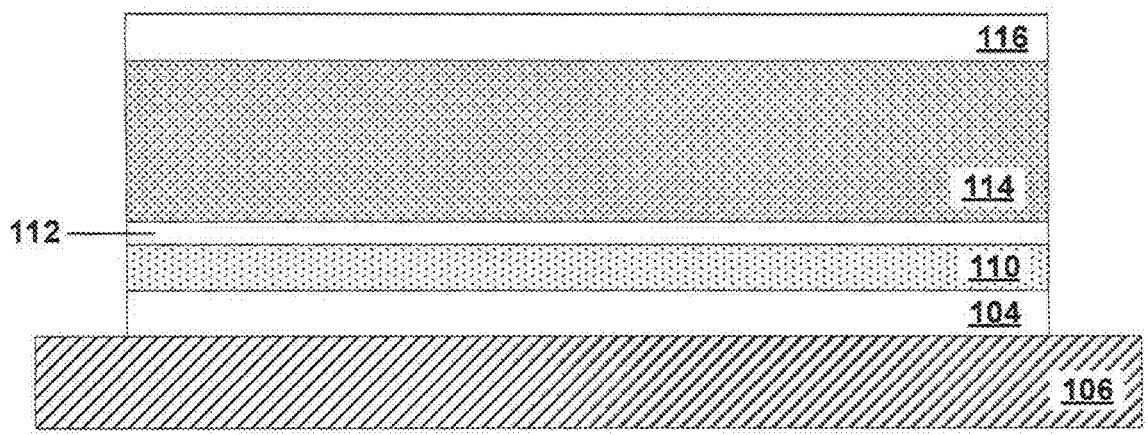
FIG. 3 is a cross section view illustrating depositing additional layers on top of the spalled substrate layer according to an exemplary embodiment.

Referring now to FIG. 3, a structure 200 is shown, in accordance with an embodiment. The structure 200 may include the spalled substrate layer 110, the metal layer 104, and the handle layer 106, described herein with reference to FIGS. 1-2. The structure 200 may also include an electrolyte layer 112, a cathode 114, and a cathode contact layer 116.

The electrolyte layer 112 is deposited onto the top surface of the spalled substrate layer 110. In an embodiment, the electrolyte layer 112 may include a thin solid film, such as, for example, LiPON, or a spin-applied solgel, although other materials may be employed. The electrolyte layer may be deposited by evaporation, chemical vapor deposition, sputtering or other suitable deposition process. In an embodiment, the electrolyte layer 112, and other subsequent layers, may be deposited over the whole top surface of the spalled substrate layer 110, creating a single battery. In an alternative embodiment, portions of the spalled substrate layer 110 may be masked and the electrolyte layer 112 may be deposited onto the unmasked portions of the spalled substrate layer 110, creating an array of batteries that may be subsequently cut to size.

The electrolyte layer 112 may be deposited on the top surface of the spalled substrate layer 110, between the spalled substrate layer 110 and the cathode 114, separating layers 110 and 114. The electrolyte layer 112 may provide ion conduction between the cathode 114 and the spalled substrate layer 110.

The thickness of the electrolyte layer 112 may have an effect on the performance of the battery. Typically, lithium ions travel from the anode to the cathode 114 through the electrolyte layer 112. The thinner the electrolyte layer 112, the less resistance the lithium ions encounter when passing through the electrolyte layer 112. As such, the thinner the electrolyte layer 112, the better performance the battery may have. However, depositing a thin electrolyte layer 112 may be problematic because thin electrolyte layer 112 tends to have holes in the electrolyte layer 112. As a result, the electrolyte layer 112 may be deposited to a thickness that provides ion conductivity between the cathode 114 and the spalled substrate layer 110 without having any holes. In an embodiment, the electrolyte layer 112 may be less than 1 micron thick.

The cathode 114 may be deposited on the top surface of the electrolyte layer 112. The cathode 114 may be made from lithium containing material, such as, for example, $LiCO_2$, $LiMn_2O_4$, $LiFePO_4$ or other suitable cathode material (e.g., metal oxides). The cathode 114 may be deposited onto the electrolyte layer 112 using known deposition techniques, such as, for example, sputtering. The cathode 114 may be deposited to a desired thickness. Since the thickness of the cathode 114 correlates to the capacity of the battery, the thicker the cathode 114, the greater the battery capacity. In addition, the thickness of cathode 114 may correspond to the thickness of the spalled substrate layer 110 because the spalled substrate layer 110 should be thick enough so that all of the lithium ions in the cathode 114 may flow into the spalled substrate layer 110.

The cathode contact layer 116 may be deposited on the top surface of the cathode 114. The cathode contact layer 116 is a cathode collector layer and serves as a current path for the cathode 114. The cathode contact layer 116 may be made of non-reactive metals such as, for example, aluminum or copper, or any other suitable material. The cathode contact layer 116 may be deposited by evaporation, chemical vapor deposition, sputtering or other suitable deposition process.

The structure 200, shown in FIG. 3, is a battery that is formed on the handle layer 106. The metal layer 104 acts as an anode collector layer, serving as a current path for the anode, which is the spalled substrate layer 110. Embodiments of the invention contemplate using the spalled substrate layer 110 as the anode, as opposed to conventional anode layers made of lithium or a lithium alloy.

Using the spalled substrate layer 110 as the anode generates a battery that is safer than a conventional battery that has an anode layer made of lithium. The spalled substrate layer 110 is made of silicon. Silicon is an inert material, thus making it safer to use when constructing a battery. In addition, silicon has more specific capacity to hold lithium ions than lithium itself. As a result, having the spalled substrate layer 110 as the anode produces the structure 200 that has higher capacity when compared to a conventional battery with a lithium anode layer. Furthermore, since the spalled substrate layer 110 may be flexible, the resultant battery structure 200 is also flexible, allowing the structure 200 to be used in different applications.

Figure 4:
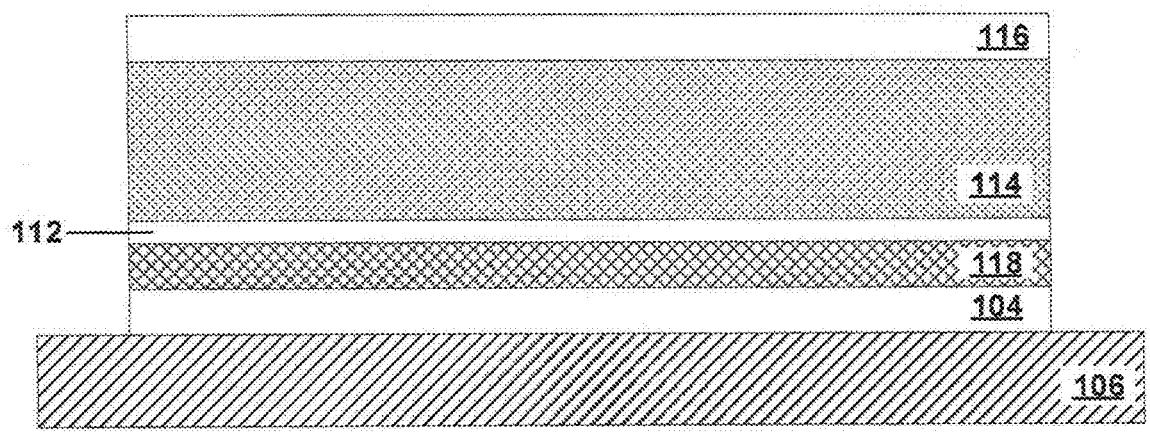
FIG. 4 is a cross section view illustrating depositing additional layers on top of a porous substrate according to an exemplary embodiment.

Referring now to FIG. 4, a structure 300 is shown, in accordance with another embodiment of the invention. The structure 300 is a battery. The structure 300 may be substantially similar in all respects to the structure 200 described in detail above; however, in the present embodiment, the structure 300 does not include the spalled substrate layer. Rather, the structure includes a porous substrate layer 118.

Beginning with structure 100 of FIG. 2, once the spalling mode fracture 108 is initiated and the spalled substrate layer 110 is removed from the substrate 102, the spalled substrate layer 110 is made porous to form the porous substrate layer 118. The porosification of the spalled substrate layer 110 may be accomplished by putting the spalled substrate layer 110 into a bath of acid, such as, for example, hydrofluoric acid and applying a bias to the bath. The combination of the acid with the bias cause the spalled substrate layer 110 to form minute spaces or holes forming the porous substrate layer 118.

The porous substrate layer 118 acts as the anode in the resultant structure 300. In addition, because the porous substrate layer 118 has many minute spaces or holes it in, the porous substrate layer 118 may hold more lithium ions than the spalled substrate layer of FIG. 3. Structure 300 may have a thicker cathode because the porous substrate layer 118 may hold the additional lithium ions. Since the thickness of the cathode 114 determines the capacity of the battery, having the porous substrate layer 118 increases the thickness of the cathode 114 thus increasing the capacity of the structure 300.

Once the porous substrate layer 118 is formed, the electrolyte layer 112 is deposited onto the top surface of the porous substrate layer 118. The cathode 114 is then deposited onto the top surface of the electrolyte layer 112, followed by the deposition of the cathode contact layer 116. The resultant structure 300 includes the porous substrate layer 118 that acts as an anode.

Figure 5:
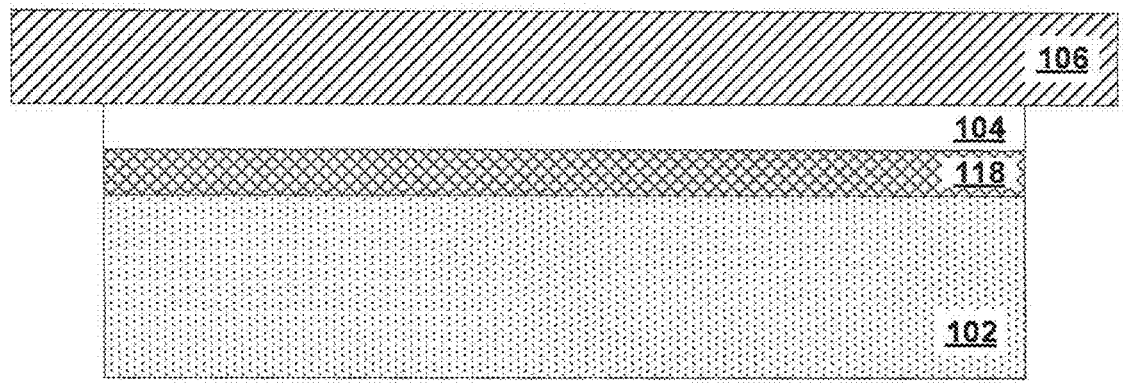
FIG. 5 is a cross section view illustrating the porous substrate layer before it is spalled according to an exemplary embodiment.

Referring now to FIG. 5, a structure 400 is shown, in accordance with another embodiment of the invention. The structure 400 may include the substrate 102, the porous substrate layer 118, the metal layer 104, and the handle layer 106. The substrate 102, the metal layer 104, and the handle layer 106 may be made of materials described with reference to FIG. 1.

The top surface of the substrate 102 is used to grow an additional layer of doped silicon. The doped silicon is grown to a desired thickness. Once the desired thickness of the doped silicon is reached, the grown doped silicon then undergoes a porosification step. The grown doped silicon is submerged in a bath of acid, such as, for example, hydrofluoric acid, and a bias is applied. The submerged portion of the grown doped silicon porosifies, forming the porous substrate layer 118. Once the porous substrate layer 118 is formed, the metal layer 104 is deposited onto the top surface of the porous substrate layer 118, using known deposition techniques. The handle layer 106 is then deposited onto the top surface of the metal layer 104. The resultant structure 400 includes the handle layer 106, the metal layer 104, the porous substrate layer 118, and the substrate 102.

Figure 6:
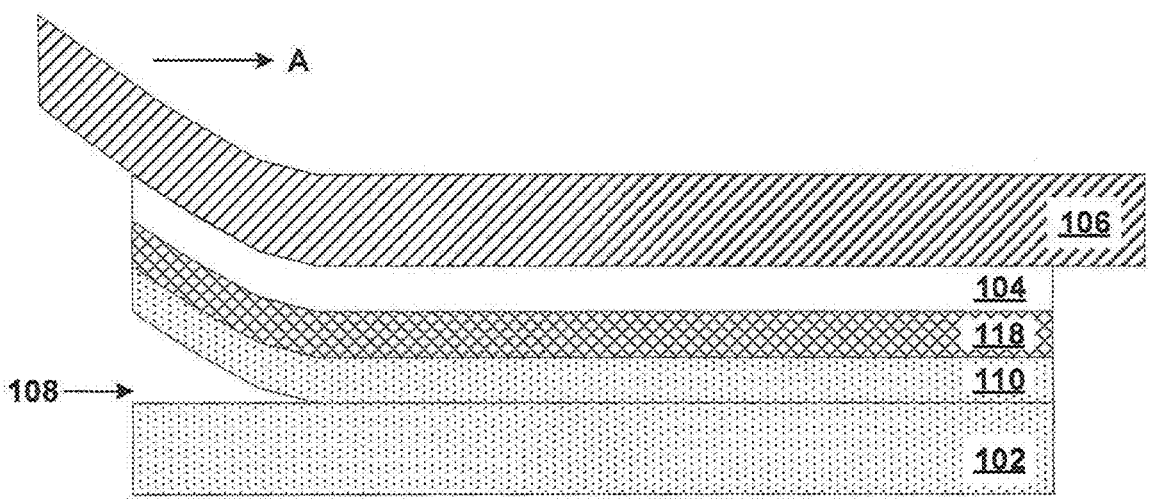
FIG. 6 is a cross section view illustrating spalling layers of the porous substrate and non-porous substrate according to an exemplary embodiment.

Referring now to FIG. 6, the structure 400 with the spalling mode fracture 108 is shown, in accordance with an embodiment. The spalling mode fracture 108 occurs in the substrate 102 at a depth below the substrate/porous substrate layer interface. The spalling mode fracture 108 occurs at a depth below the substrate/porous substrate layer interface. The depth at which the spalling mode fracture 108 occurs is dependent on the thickness of the metal layer 104. As such, the thicker the metal layer 104, the greater the depth at which the spalling mode fracture 108 may occur.

The spalling mode fracture 108 may be initiated by applying a small force on the handle layer 106 near the edge of the substrate 102. Once the spalling mode fracture 108 is initiated, the handle layer 106 is gently pulled upwards and in direction A. The pulling of the handle layer 106 pulls the metal layer 104 causing the porous substrate layer 118 and a portion of the substrate 102 to be spalled. The spalling removes the top portion of the substrate 102 from the remaining portion of the substrate 102. The resultant structure 400 includes the spalled substrate layer 110, the porous substrate layer 118, the metal layer 104, and the handle layer 106.

In an alternative embodiment, the spalling mode fracture 108 may be initiated in the substrate 102 at the substrate/porous substrate layer interface. Initiating the spalling mode fracture 108 at the substrate/porous substrate layer interface may be achieved by controlling the thickness of the metal layer 104. Having the spalling mode fracture 108 initiated at the substrate/porous substrate layer allows for only the porous substrate layer 118 to be spalled, leaving the substrate 102 intact.

Having the porous substrate layer 118 in addition to the spalled substrate layer 110 allows for more free flow of the lithium ion as opposed to just having the spalled substrate layer 110. This is due to the fact that the porous substrate layer 118 is less conductive than the spalled substrate layer 110. In addition, because the porous substrate layer 118 may hold more lithium ion, the capacity of the resultant structure (illustrated in FIG. 7) increases. Nevertheless, it is more advantageous to have the porous substrate layer 118 only and not include the spalled substrate layer 110. The spalled substrate layer 110 introduces some conductivity to the structure 400. By eliminating the spalled substrate layer 110, and only having the porous substrate layer 118 increases the free flow of lithium ions thus increasing the capacity of the resultant structure 400.

Figure 7:
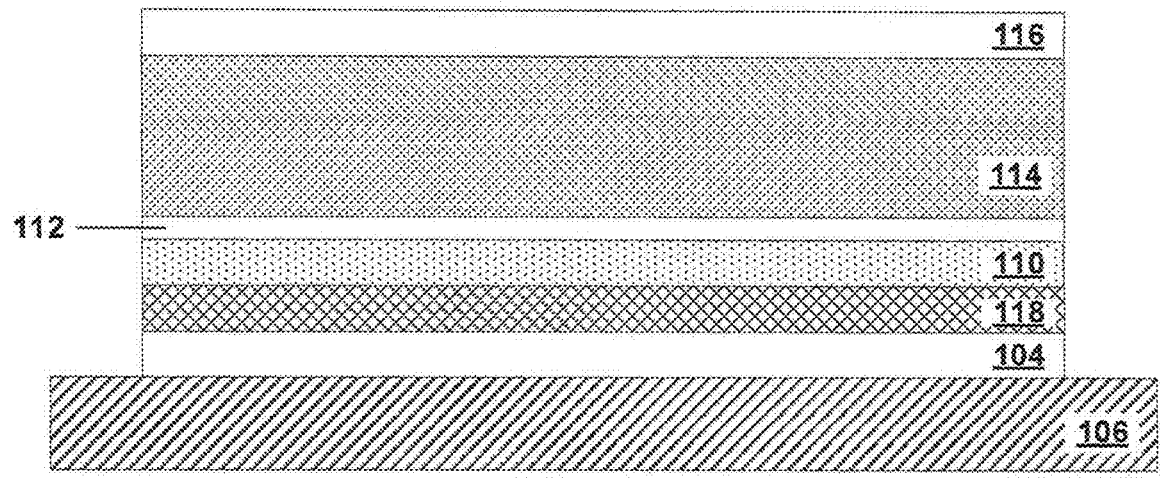
FIG. 7 is a cross section view illustrating depositing additional layers on top of the non-porous substrate according to an exemplary embodiment.

Referring now to FIG. 7, a structure 500 is shown, in accordance with an alternative embodiment. The structure 500 is the structure 400 (illustrated in FIG. 6) with additional layers deposited on top of the porous substrate layer 118. In addition to having the spalled substrate layer 110, the porous substrate layer 118, the metal layer 104, and the handle layer 106, the structure 500 may also include the electrolyte layer 112, the cathode 114, and the cathode contact layer 116.

In an embodiment, the electrolyte layer 112 is deposited, using conventional deposition techniques described in detail with reference to FIG. 3, onto the top surface of the spalled substrate layer 110. The cathode 114 is then deposited onto the top surface of the electrolyte layer 112. Finally, the cathode contact layer 116 is deposited onto the top surface of the cathode 114.

In an alternative embodiment, there is no spalled substrate layer 110. Rather, the electrolyte layer 112 is deposited onto the top surface of the porous substrate layer 118. As a result, the structure may have the handle layer 106 with the metal layer 104 deposited directly onto the top surface of the handle layer 106. The porous substrate layer 118 is formed onto the top surface of the metal layer 104. Once the porous substrate layer 118 is formed, the electrolyte layer 112 is deposited onto the top surface of the porous substrate layer 118, followed by the cathode 114 being deposited onto the top surface of the electrolyte layer 112. Finally, the cathode contact layer 116 is deposited onto the top surface of the cathode 114.

Figure 8:
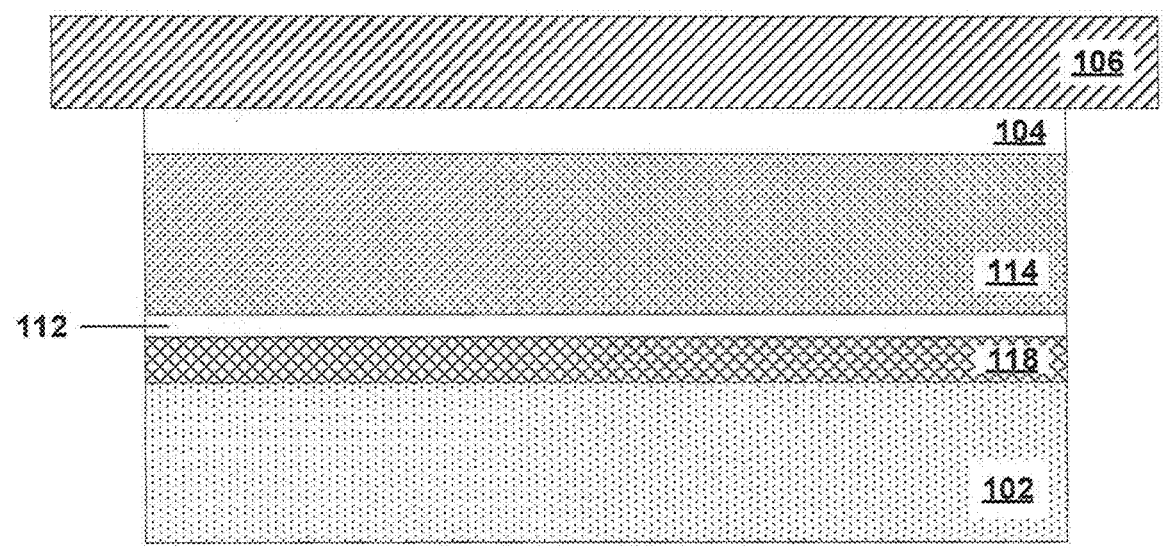
FIG. 8 is a cross section view illustrating depositing all layers on top of the substrate according to an exemplary embodiment.

Referring now to FIG. 8, a structure 600 is shown, in accordance with an alternative embodiment. The structure 600 may include the substrate 102, the porous substrate layer 118, the electrolyte layer 112, the cathode 114, the metal layer 104, and the handle layer 106. Starting with the substrate 102, the top surface of the substrate 102 is used to grow an additional layer of doped silicon. Once the doped silicon is grown to a desired thickness, the doped silicon is porosified. The grown doped silicon is submerged in a bath of acid, such as, for example, hydrofluoric acid, and a bias is applied. The submerged portion of the grown doped silicon porosities, forming the porous substrate layer 118.

Once the porous substrate layer 118 is formed, the electrolyte layer 112 is deposited onto the top surface of the porous substrate layer 118, using conventional deposition techniques. The cathode 114 is then deposited onto the top surface of the electrolyte layer 112. The metal layer 104 is then deposited onto the top surface of the cathode 114. Finally, the handle layer 106 is deposited onto the top surface of the metal layer 104 such that a portion of the metal layer 104 overlaps the other layers below the handle layer 106.

After all the layers are deposited onto the substrate 102, the spalling mode fracture is initiated by applying a small force onto the handle layer 106. Once the fracture 108 is initiated, the handle layer 106 is gently pulled. The pulling of the handle layer 106 causes the layers below the handle layer to be spalled. Since the spalling mode fracture occurs at the substrate/porous substrate layer interface, the pulling of the handle layer 106 pulls the porous substrate layer 118 from the substrate 102 such that only the porous substrate layer 118 is spalled, but the substrate 102 is not.

Figure 9:
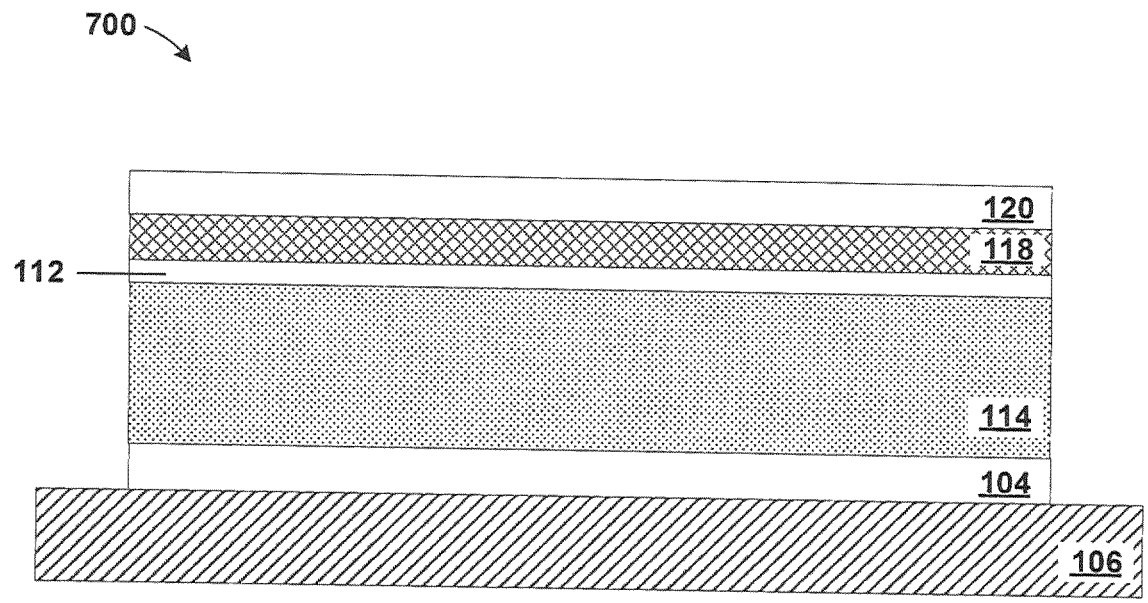
FIG. 9 is a cross section view illustrating spalling of all layers deposited on top of the substrate according to an exemplary embodiment.

Referring now to FIG. 9, a structure 700 is shown, in accordance with an embodiment. The structure 700 may also be referred to as a battery. The structure is substantially similar to the structure 600; however, the structure 700 does not have the substrate 102, but does have an anode contact layer 120. After the structure 600 undergoes spalling, the anode contact layer 120 is deposited onto the top surface of the porous substrate layer 118. The anode contact layer 120 may be made of non-reactive metals such as, for example, aluminum or copper, or any other suitable material. The anode contact layer 120 may be deposited by evaporation, chemical vapor deposition, sputtering or any other suitable deposition process.

In this embodiment, since the metal layer 104 is in direct contact with the cathode 114, the metal layer 104 acts as the cathode collector layer and serves as a current path for the cathode 114. In addition, the porous substrate layer 118 acts as the anode. As such, lithium ions travel from the cathode 114, through the electrolyte layer 112, to the porous substrate layer 118, and vice versa. The anode contact layer 120 acts as the anode collector layer and serves as a current path for the porous substrate layer 118.

Figure 10:
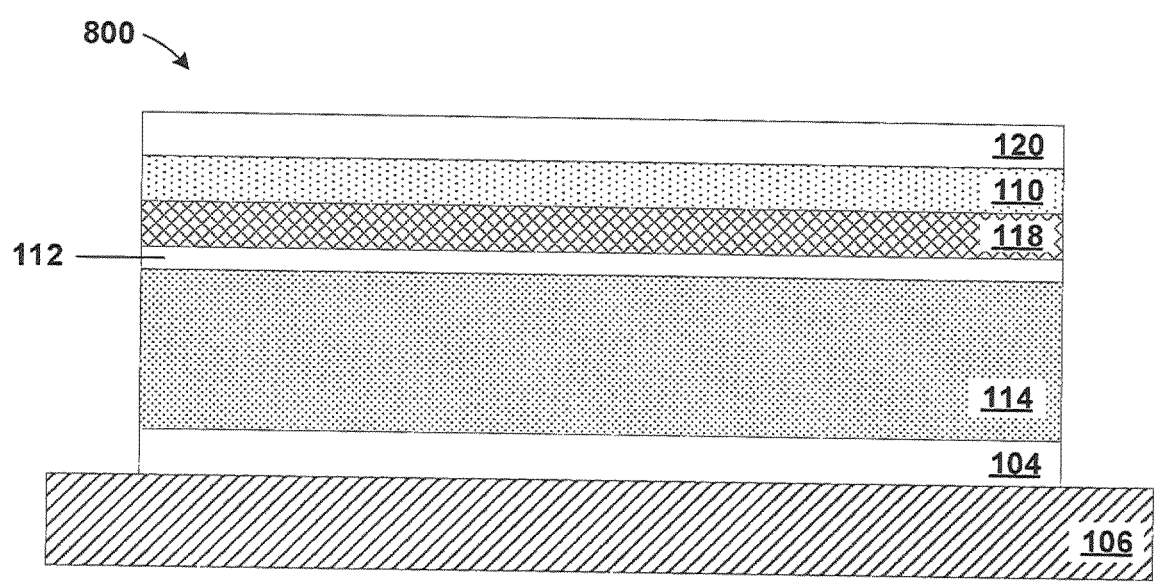
FIG. 10 is a cross section view illustrating spalling of all layers, including the non-porous substrate layer according to an exemplary embodiment.

Referring now to FIG. 10, a structure 800 is shown, in accordance with an embodiment. The structure 800 is a battery and is substantially similar to the structure 700; however, the structure 800 includes the spalled substrate layer 110 in addition to the porous substrate layer 118.

Beginning with the structure 600 of FIG. 8, after all the layers are deposited onto the substrate 102, the spalling mode fracture 108 is initiated by applying a small force onto the handle layer 106. The spalling mode fracture 108 occurs below the substrate/porous substrate layer interface. Once the spalling mode fracture 108 is initiated, the handle layer 106 is gently pulled. The pulling of the handle layer 106 causes the layers below the handle layer to be spalled. Since the spalling mode fracture occurs below the substrate/porous substrate layer interface, the pulling of the handle layer 106 spalls a portion of the substrate 102, forming the spalled substrate layer 110.

Once all of the layers are spalled from the substrate 102, the anode contact layer 120 is deposited onto the top surface of the spalled substrate layer 110. In this embodiment, since the metal layer 104 is in direct contact with the cathode 114, the metal layer 104 acts as the cathode collector layer and serves as a current path for the cathode 114. In addition, the porous substrate layer 118 and the spalled substrate layer 110 act as the anode. As such, lithium ions travel from the cathode 114, through the electrolyte layer 112, to the porous substrate layer 118 and the spalled substrate layer 110, and vice versa. The anode contact layer 120 acts as the anode collector layer and serves as a current path for the porous substrate layer 118 and the spalled substrate layer 110.

Structure 700 and structure 800 are substantially similar. Both structures have the handle layer 106, the metal layer 104 that acts as the cathode collector layer, the cathode 114, the electrolyte layer 112, the porous substrate layer 118 that acts as the anode, and the anode contact layer 120 that acts as the anode collector layer. However, structure 800 has an additional layer, the spalled substrate layer 110, sandwiched between the porous substrate layer 118 and the anode contact layer 120. Even though the spalled substrate layer 110 may provide more capacity when compared to the materials used as the anode in conventional batteries, having the spalled substrate layer 110 in addition to the porous substrate layer 118 is not as advantageous as only having the porous substrate layer 118. When compared to each other, the porous substrate layer 118 is less conductive than the spalled substrate layer 110, allowing for more free flow of lithium ions into the porous substrate layer 118 than the spalled substrate layer 110.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A structure comprising:
    a porous substrate layer positioned along a metal layer having a given stress value and a first thickness corresponding to controlled spalling, wherein the porous substrate layer is made of p-type doped silicon, wherein the first thickness of the metal layer is less than a second thickness associated with spontaneous spalling of the porous substrate layer, wherein at least a portion of the porous substrate layer is spalled and at least a portion of the porous substrate layer is non-spalled, and wherein the non-spalled portion of the porous substrate layer contains fewer lithium ions than the spalled portion of the porous substrate layer;
    a handle layer positioned below the metal layer, wherein the handle layer is configured to initiate a spalling mode fracture in the porous substrate layer based on applying a force on the handle layer;
    an electrolyte layer positioned along the porous substrate layer; and
    a cathode positioned on top of the electrolyte layer, wherein the electrolyte layer has a third thickness configured to provide ion conductivity between the cathode and the porous substrate layer without holes in the electrolyte layer, and wherein the electrolyte layer separates the cathode from the porous substrate layer.

2. The structure of claim 1, wherein the handle layer is composed of a metal tape and extends past an edge of the metal layer, and wherein the metal layer separates the handle layer from the porous substrate layer.

3. The structure of claim 1, wherein the metal layer is made of non-reactive metal having high tensile strength.

4. The structure of claim 1, wherein the porous substrate layer is an anode.

5. The structure of claim 1, further comprising:
    an anode contact layer on top of the porous substrate layer.

6. The structure of claim 1, wherein the cathode and the metal layer are porous.

7. The structure of claim 1, further comprising a cathode contact layer positioned on top of the cathode.

* * * * *